United States Patent [19]

Richardson

[11] Patent Number: 5,748,892

[45] Date of Patent: May 5, 1998

[54] METHOD AND APPARATUS FOR CLIENT MANAGED FLOW CONTROL ON A LIMITED MEMORY COMPUTER SYSTEM

[75] Inventor: John Richardson, Boca Raton, Fla.

[73] Assignee: Citrix Systems, Inc., Ft. Lauderdale, Fla.

[21] Appl. No.: 621,848

[22] Filed: Mar. 25, 1996

[51] Int. Cl.$^6$ .............................. G06F 9/44; G06F 9/00; G06F 13/00

[52] U.S. Cl. .................... 395/200.3; 395/200.33; 395/200.56; 395/200.59; 395/200.43; 395/200.47; 395/674; 395/672; 395/675

[58] Field of Search ................... 395/200.01, 200.03, 395/200.04, 200.08, 200.09, 200.13, 200.31, 200.34, 200.43, 200.47, 200.62, 200.53, 200.56, 200.55, 200.57, 200.61, 200.68, 200.69, 200.7, 200.75, 200.33, 200.38, 200.59, 674; 675, 672, 670

[56] References Cited

U.S. PATENT DOCUMENTS

| | | | |
|---|---|---|---|
| 4,937,784 | 6/1990 | Masai et al. | 395/674 |
| 5,014,221 | 5/1991 | Mogul | 395/113 |
| 5,305,440 | 4/1994 | Morgan et al. | 395/200.03 |
| 5,325,527 | 6/1994 | Cwikowski et al. | 395/200.1 |
| 5,329,619 | 7/1994 | Page et al. | 395/200.01 |
| 5,341,477 | 8/1994 | Pitkin et al. | 395/200.09 |
| 5,367,688 | 11/1994 | Croll | 395/652 |
| 5,440,719 | 8/1995 | Hanes et al. | 395/500 |
| 5,515,508 | 5/1996 | Pettus et al. | 395/200.01 |

FOREIGN PATENT DOCUMENTS 0 381 645  8/1990  European Pat. Off. .

WO 93/15457  8/1993  WIPO .

OTHER PUBLICATIONS

"Allocation of Equivalent Communication Buffer Sizes in SQLJRA Remote Protocol", *IBM Technical Disclosure Bulletin*, vol. 36, No. 1, 1 Jan. 1993, pp. 29–31.

"Workstation Load Leveling Technique Using Buffer Allocation", *IBM Technical Disclosure Bulletin*, vol. 30, No. 7, Dec. 1987, pp. 357–359.

Liu P. et al. "Efficient Algorithms for Resource Allocation in Distributed and Parallel Query Processing Environments", The 9th International Conference on Distributed Computing Systems, Newport Beach, California, Jun. 5, 1989.

*Primary Examiner*—James P. Trammell
*Assistant Examiner*—Tuan Q. Dam
*Attorney, Agent, or Firm*—Testa, Hurwitz & Thibeault, LLP

[57] ABSTRACT

A method and apparatus for controlling data flow on a network having a server and a non-blocking client node in which the client node may not drop requests received from the server. A process on the non-blocking client node allocates resources on the non-blocking client node and notifies the server of the allocated resources. The server then determines the resources on the non-blocking client node required to fulfill a request by an application on the server and whether sufficient resources are available on the non-blocking client node to fulfill the request by the application. If sufficient resources are available, the server then sends the request to the client node and if sufficient resources do not exist, the server waits until sufficient resources do exist to issue the request to the non-blocking client node.

7 Claims, 3 Drawing Sheets

METHOD AND APPARATUS FOR CLIENT MANAGED FLOW CONTROL ON A LIMITED MEMORY COMPUTER SYSTEM

FIELD OF THE INVENTION

The invention relates to communications systems for computers in general and more specifically to communications systems for computer networks.

BACKGROUND OF THE INVENTION

A contemporary computer network consists of a number of computers, called nodes, communicating with one another by sending packets of data over a series of communications links. The computers communicate according to a set of rules which is generally termed a communication protocol. One model of a communication protocol describes a series of layers each with a specialized function. The lowest three protocol layers together are generally termed the network services.

The lowest protocol layer of the network services is termed the physical layer. The physical layer is the set of standards governing the physical characteristics of the communication link, including the voltages at which data will be transmitted, and the frequency at which the data pulses are applied to the communication link. The protocol layer above the physical layer is the data link layer.

The data link layer is responsible for dividing the original data at the transmitting node into packets and reassembling the data packets into the original data at the receiving node. In addition, the data link layer is responsible for the error free transmission of data. The data link layer accomplishes this by having the receiving node transmit an acknowledgment to the transmitting node each time a packet or group of packets is received. If the data link layer fails to receive an acknowledgment, after a specified time, in response to a transmission, the datalink layer typically assumes that the data packet did not reach the receiving node and transmits the packet again. The use of acknowledgments acts as a flow control mechanism to prevent data from being transmitted too rapidly to the receiving node.

With the assurance of the guaranteed accurate delivery of data packets, computer networks of small computers are used to perform the tasks once relegated to large main frames. In such networks certain nodes called clients request services from other nodes called servers. For example, users on client nodes can access data on server nodes, thereby avoiding the necessity of having storage for that data on the user's node.

In a typical application known to the prior art, a client node executing an application locally requests data from a file server node. If the file server node finds it has insufficient buffers to transmit the required data, the file server node simply blocks, and awaits the availability of transmission buffers. The file server node, having a complete operating system and sufficient memory, can block the one task serving data to the one client while continuing processing on other tasks. When transmission buffers become available, the file server node unblocks and transmits the buffers of data to the client node.

In another, non-typical, application, the client node executes an application located on another network node, termed a network application execution server. In this case the client node merely acts as an input and output device for the network application execution server. Because the client node is used principally for data input and display, such a client node is typically a less powerful computer having a less than complete operating system and a small amount of memory. When the application executing on the network application execution server needs data, it typically must request that data from the client. Thus in this application the typical roles of client and server are reversed with respect to the transmission of data.

The use of a smaller, less powerful, computer creates the problem that if the client has insufficient transmission buffers available it can not block while waiting for the buffers to become available. This is because the client node typically is capable of running only one task at a time, and blocking on the single task would prevent the computer from running other tasks. Further, the client can not simply drop the request, and allow the network application execution server to time out, because the lack of sufficient buffers on a small memory client node is a fairly frequent occurrence and doing so would result in a degradation in performance.

The present invention provides a method and apparatus for providing flow control in a network with a non-blocking client that may not drop requests

SUMMARY OF THE INVENTION

In one embodiment the invention relates to a method for controlling data flow on a network having a server and a non-blocking client node in which the client node may not drop requests received from the server. The method includes the steps of allocating resources on the non-blocking client node and notifying the server of the allocated resources. The server then determines resources on the non-blocking client node required to fulfill a request by an application on the server and whether sufficient resources are available on the non-blocking client node to fulfill the request by the application. If sufficient resources are available on the non-blocking client node to fulfill the request, the server then sends the request to the client node and if sufficient resources do not exist, the server waits until sufficient resources do exist to issue the request to the non-blocking client node. In another embodiment, the server divides a divisible request into subrequests which may be satisfied by the resources available on said non-blocking client node.

In yet another embodiment, the invention relates to a flow controller on a network including a server node and a non-blocking client node interconnected by a communications link. The non-blocking client node includes memory and a processor. The processor on the non-blocking client node allocates resources and notifies the server node over the communications link of the resources available. A flow control process on the server node executing an application receives a request from the application directed to the non-blocking client node. The server flow control process determines if there are sufficient resources available on the non-blocking client node to service the request. If sufficient resources are available the server flow control process passes the request from the application to the non-blocking client node over the communications link. If sufficient resources are not available, the server process holds the request until the server process receives information from the non-blocking client node that sufficient resources are available to service the request from the application.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
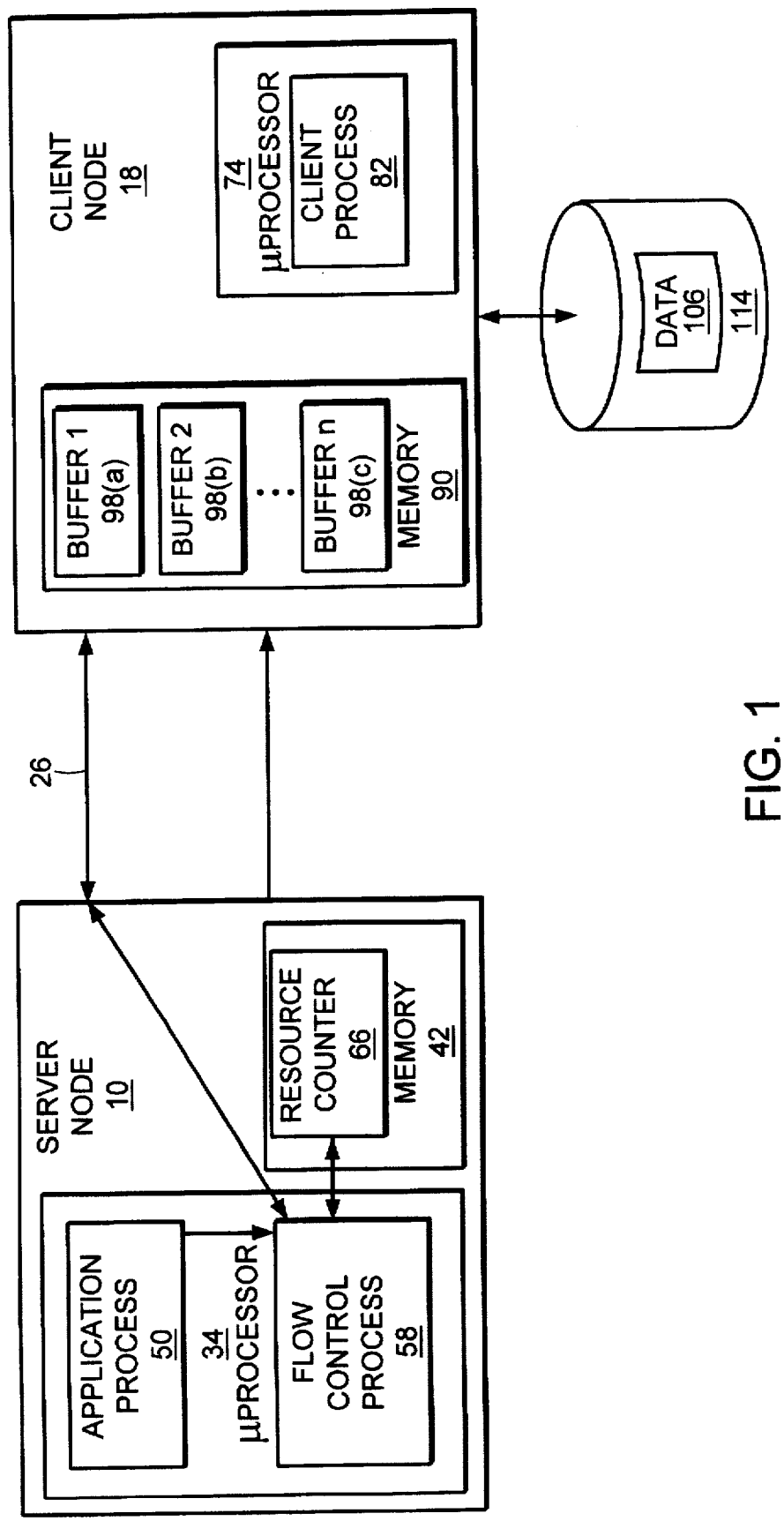
FIG. 1 is a block diagram of an embodiment of a server node and a non-blocking client node connected by a communications link in a network in accordance with the invention of the application.

In brief overview, and referring to FIG. 1, a network constructed in accordance with the invention includes a server node 10, a non-blocking client node 18, and a communications link 26. The server node 10 includes a microprocessor 34 and a memory 42. The server microprocessor 34 is executing an application process 50 and a flow control process 58. The server node 10 also includes a resource counter 66 in memory 42. The non-blocking client node 18 also includes a microprocessor 74 executing a client process 82 and having a limited amount of memory 90. By limited memory, it is meant that there is an insufficient amount of communications buffer space available to handle the number of requests that the node receives. In the prior art such a condition typically resulted in the dropping of requests or the associated replies.

Upon booting, the client process 82 divides the available buffer memory 90 into allocable resources such as buffers 98(a)–(c). This assures that memory for a given service is available on a client-host connection basis.

In operation, the client node 18 sends a message over the communication link 26 to the server node 10 indicating the amount of resources 98(a)–(c) that the client node 18 has available and the maximum size of each buffer. The flow control process 58 loads this number into its resource counter 66 located in memory in the data structure which describes the connection. The client node 18 may then ask the server node 10 to execute an application process 50 for the client node 18. For example, the application process may be an accounting program.

When the application process 50 executes it may need to receive data from the client node 18 and it makes such a request to the flow control process 58. For example, the application program 50 may require data to be received from the client node 18 from storage 106 on disk 114. The flow control process 58 determines if the client node 18 has enough resources, for example buffers 98(a)–(c), to service the request by examining the resource counter 66 in memory 42. If enough buffers 98(a)–(c) exist on the client node 18, the server node 10 transmits the request to the client node 18, and decrements the number of available resources in the resource counter 66.

If sufficient resources 98(a)–(c) do not exist on the client node 18, the flow control process 58 determines if the request from the application process 50 can be divided into a number of smaller requests for which there are sufficient resources on the client node 18. For example, if the application 50 required five buffers of information from the client node 18 and the client node had only three buffers available, the flow control process 58 would divide the request into a request for three buffers of data from the client node 18. The flow control process 58 then holds the remaining subrequest for two buffers until such resources become available on the client node 18. Once the client node 18 has completed the transmission of data to the application process 50 and has therefore released buffers for reuse, the server node 10 notes the arrival of three buffers and increments the resource counter 66 by three indicating additional resources available on the client node 18. However, because of the single threaded nature of the client, transmission may not be accomplished right away, and as a result the request and/or the reply will remain in the pre-allocated buffer until transmission is completed.

Figure 2:
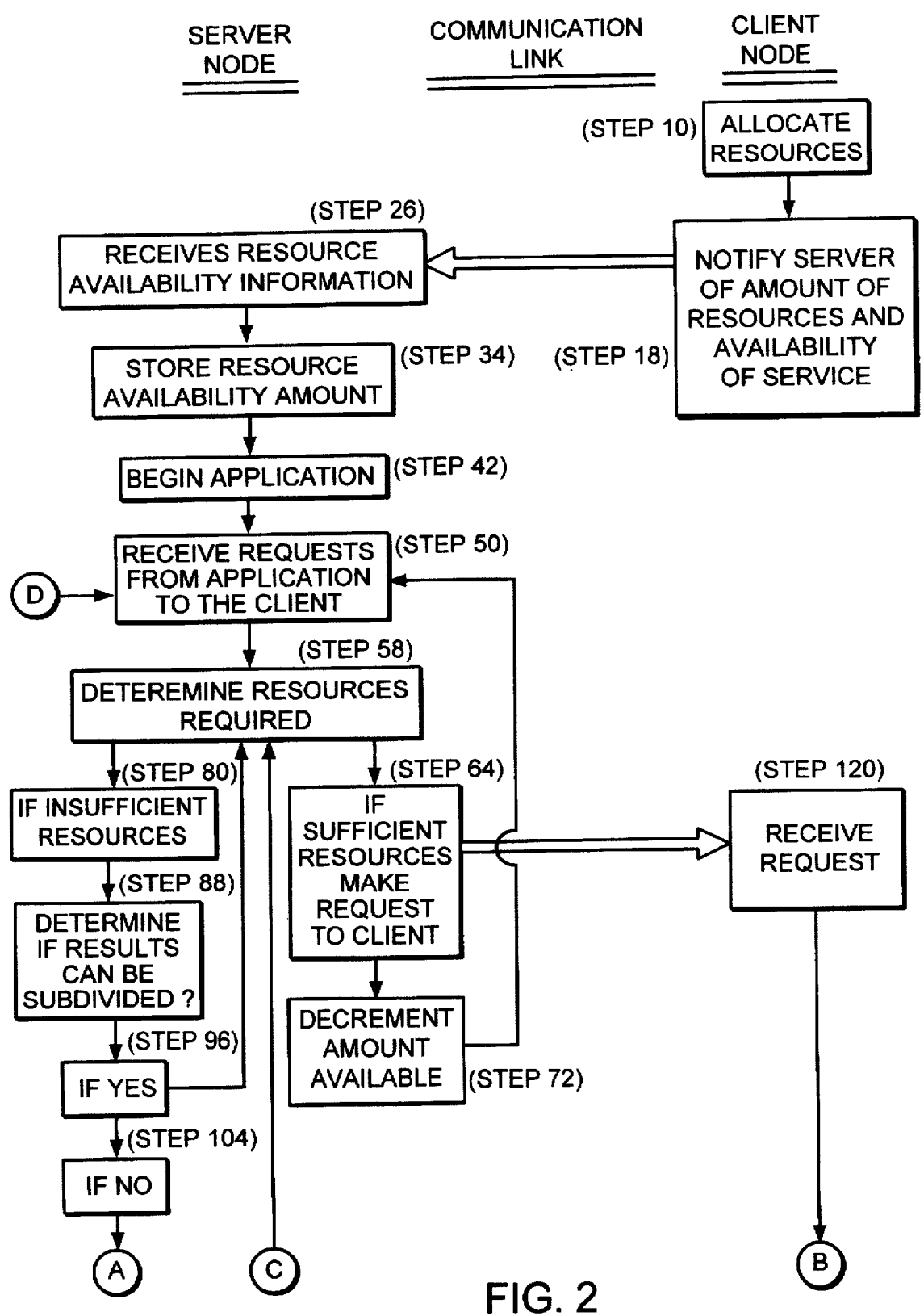
FIGS. 2 and 2A is a flow diagram of an embodiment of the method of the invention.
Figure 2A:
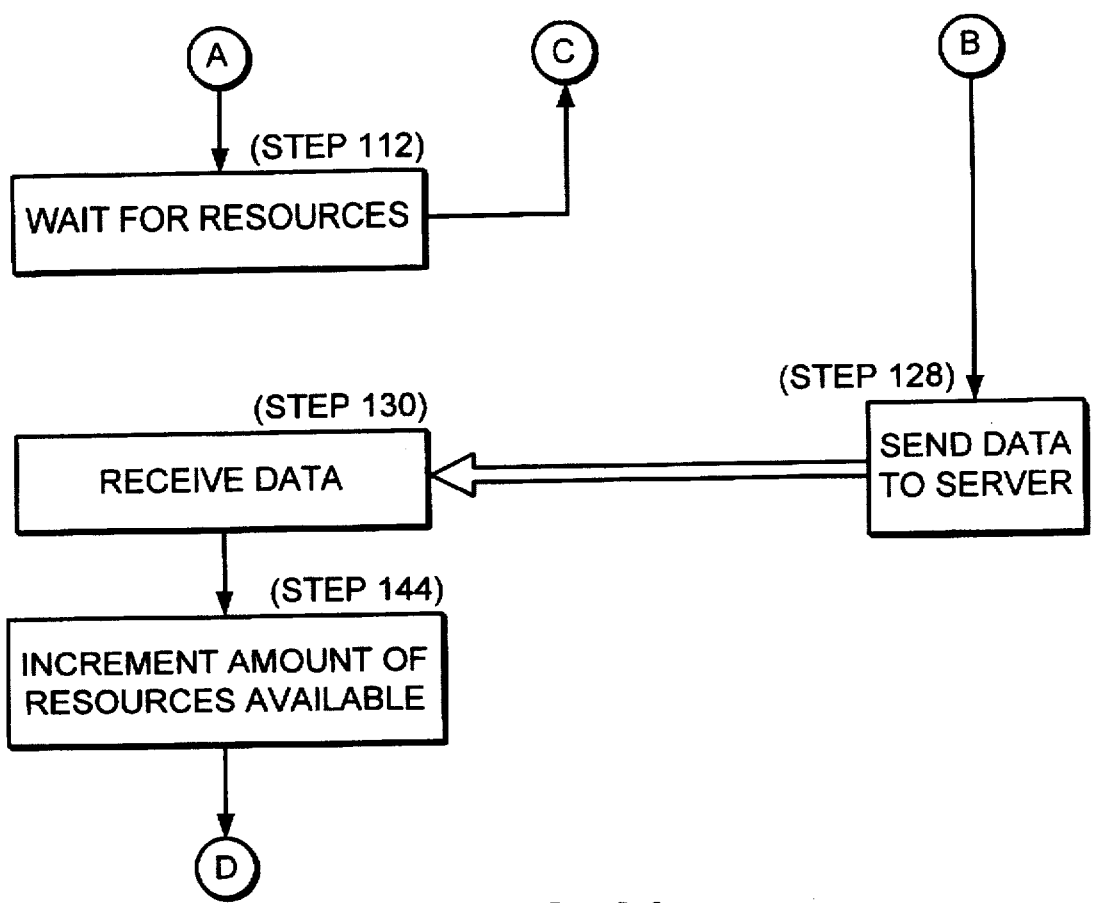

Considering the process in more detail, and referring to FIGS. 2 and 2A the client node 18 allocates buffers (Step 10) by dividing the available buffer memory into transmit and receive buffers. The client 18 then sends a message (Step 18) over the communication link 26 to the server node 10 indicating that the client node 18 is available for data transmission and indicating the number of transmit buffers 98(a)–(c) that the client node 18 has available. The flow control process 58 on the server node 10 receives this message (Step 26) and stores (Step 34) this number of available buffers in its memory 42. Once the application 50 on the server node 10 is running (Step 42), the flow control process 58 receives requests (Step 50) for data from the application 50 and directed at the client node 18.

The flow control process 58 determines (Step 58) if the client node 18 has enough buffers 98(a)–(c) available to service the request. The flow control process 58 does so by examining the number of buffers stored in memory 42. If the flow control process 58 determines (Step 64) that enough buffers 98(a)–(c) exist on the client node 18, the server node 10 transmits the request to the client node 18, and decrements (Step 72) the number of available buffers listed in memory 42.

If the flow control process determines (Step 80) that sufficient buffers 98(a)–(c) do not exist on the client node 18, the flow control process 58 then determines (Step 88) if the request can be divided. If the request can be divided (Step 96) the amount of buffers needed for the divided request (Step 58) is determined as previously described. If the request can not be further divided (Step 104) the flow control process then awaits a sufficient number of available buffers (Step 112) for the divided request.

Once the client node 18 has received the request (Step 120) and transmitted (Step 128) the requested data to the server node 10, the client node 18 releases buffers for reuse. Once the server node 10 receives (Step 136) the data, it knows that buffers have been freed on the client node 18 and increments (Step 144) the number of available buffers in memory 42. In this way the server node 10 keeps an account of the number of buffers available on the client node 18 and provides the flow control necessary to prevent data from being lost, without requiring the client node to block and without dropping requests.

Having described preferred embodiments of the invention, it will now become apparent to one of skill in the art that other embodiments incorporating the concepts may be used. It is felt, therefore, that these embodiments should not be limited to disclosed embodiments but rather should be limited only the spirit and scope of the following claims.

What is claimed is:

1. A method for flow control on a network having a server and a non-blocking client node which may not drop requests, the method comprising the steps of:

allocating resources on said non-blocking client node by said non-blocking node;

notifying said server of said allocated resources by said non-blocking client node;

determining by said server the resources on said non-blocking client node required to fulfill a request made by an application executing on said server;

determining by said server whether sufficient resources are available on said non-blocking client node to fulfill said request of said application; and sending said request of said application by said server to said non-blocking client node if sufficient resources are available on said non-blocking client node to fulfill said request.

2. The method for flow control of claim 1 further comprising the step of storing said notification of said allocated resources of said non-blocking client node on said server, wherein said notification comprises information relating to available allocated resources on said non-blocking client node.

3. The method for flow control of claim 2 further comprising the step of updating said notification information by said server in response to said requests from said application being sent to said non-blocking client node.

4. The method for flow control of claim 1 further comprising the steps of:

determining by said server whether said request is divisible, if sufficient available resources are not available on said non-blocking client node to fulfill said request;

dividing said request into subrequests if said request is divisible, the number of subrequests being chosen such that sufficient resources are available on said non-blocking client node to fulfill at least one said subrequest; and sending said subrequest capable of being fulfilled by said resources on said non-blocking client node to said non-blocking client node by said server.

5. The method for flow control of claim 2 further comprising the steps of:

receiving by said server from said non-blocking client node replies to previous requests; and updating said notification stored on said server node in response to said replies.

6. A network comprising:

a non-blocking client node comprising a plurality of resources, said non-blocking client node being unable to drop requests; and a server node in communication with said non-blocking client node, said server node comprising:

an application process executing on said server node;

a flow control process executing on said server node wherein said flow control process determines if said non-blocking client node is able to receive and service a request; and a memory comprising:

resource information corresponding to available resources located on said non-blocking client node.

7. The network of claim 6, wherein said server node sends requests from said application process to said non-blocking client node in response to resource information and updates said resource information in response to requests sent to and buffers receives from said non-blocking client node.

* * * * *